United States Patent
Zhao et al.

(10) Patent No.: US 11,902,797 B2
(45) Date of Patent: Feb. 13, 2024

(54) MANAGING AIR TIME FAIRNESS OF CLIENT DEVICES IN A WIRELESS NETWORK

(71) Applicant: ARRIS Enterprises LLC, Suwanee, GA (US)

(72) Inventors: Penghui Zhao, Shenzhen (CN); Liang Wang, Guangdong (CN); Wanli Chen, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 316 days.

(21) Appl. No.: 17/297,672

(22) PCT Filed: Aug. 10, 2020

(86) PCT No.: PCT/CN2020/108257
§ 371 (c)(1),
(2) Date: May 27, 2021

(87) PCT Pub. No.: WO2022/032449
PCT Pub. Date: Feb. 17, 2022

(65) Prior Publication Data
US 2022/0312220 A1  Sep. 29, 2022

(51) Int. Cl.
*H04W 16/10* (2009.01)
*H04W 16/14* (2009.01)

(52) U.S. Cl.
CPC ........... *H04W 16/14* (2013.01); *H04W 16/10* (2013.01)

(58) Field of Classification Search
CPC ........ G01S 5/08; G01S 5/0218; H04W 4/029; H04W 16/10; H04W 16/14
See application file for complete search history.

(56) References Cited

U.S. PATENT DOCUMENTS

| 8,483,194 B1 * | 7/2013 | Wu | H04W 24/08 370/338 |
| 10,772,081 B2 * | 9/2020 | Wu | H04L 47/24 |

(Continued)

FOREIGN PATENT DOCUMENTS

| CN | 103068054 | 4/2013 |
| CN | 103957527 | 7/2014 |

(Continued)

OTHER PUBLICATIONS

International Search Report and the Written Opinion of the International Searching Authority dated Apr. 27, 2021 in International (PCT) Application No. PCT/CN2020/108257.

(Continued)

*Primary Examiner* — Dai Phuong
(74) *Attorney, Agent, or Firm* — Wenderoth, Lind & Ponack, L.L.P.

(57) ABSTRACT

A system and a method are provided to configure a home network controller device to establish a first wireless network for use by a first client device; establish a second wireless network for use by a second client device; establish a number of tokens for use on the first wireless network and the second wireless network over a first predetermined number of cycles of usage; and decrease the number of tokens for use on the first wireless network and the second wireless network over a second predetermined number of cycles of usage when a number of unused tokens over the first predetermined number of cycles of usage is greater than a threshold, so as to establish a second number of tokens for use on the first wireless network and the second wireless network over the second predetermined number of cycles of usage.

9 Claims, 7 Drawing Sheets

(56) References Cited

U.S. PATENT DOCUMENTS

| | | | |
|---|---|---|---|
| 2013/0288598 A1* | 10/2013 | Parkin | G06F 1/1632 455/41.1 |
| 2013/0304909 A1 | 11/2013 | Pappu | |
| 2013/0336319 A1* | 12/2013 | Liu | H04L 47/32 370/390 |
| 2020/0028788 A1 | 1/2020 | Chen et al. | |
| 2021/0289545 A1* | 9/2021 | Gorajala Chandra | H04W 28/0215 |

FOREIGN PATENT DOCUMENTS

| | | |
|---|---|---|
| CN | 104769864 | 7/2015 |
| CN | 110912744 | 3/2020 |
| WO | 2006/066447 | 6/2006 |

OTHER PUBLICATIONS

Bhanage, Gautam et al. VNTS: A Virtual Network Traffic 1-9 Shaper for Air Time Fairness In 802.16e Systems 2010 IEEE International Conference on Communications Jul. 1, 2010 (Jul. 1, 2010) the whole document.

\* cited by examiner

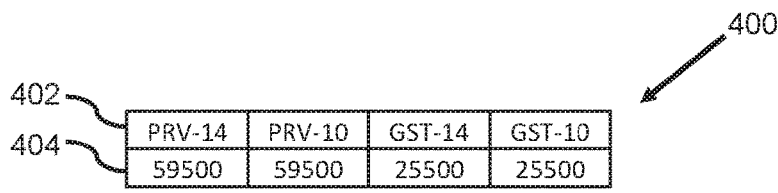
FIG. 4A
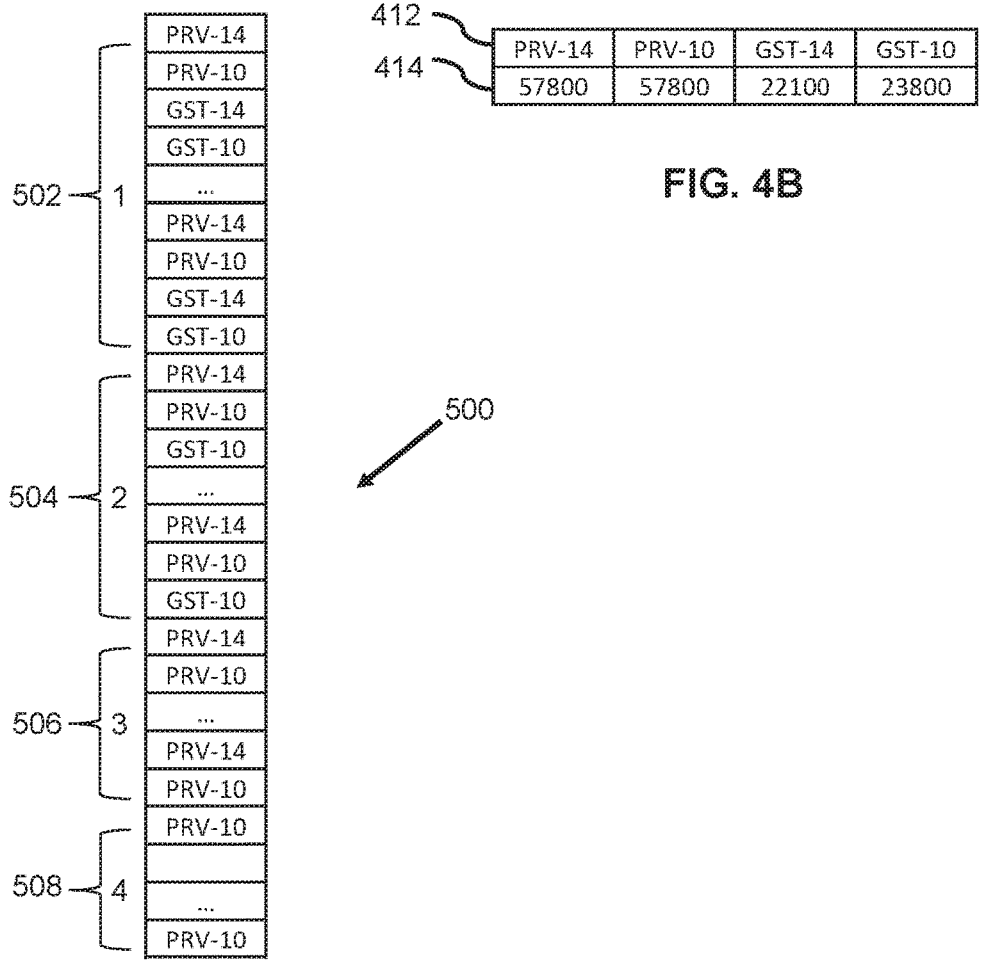
FIG. 4B
FIG. 5

FIG. 9

| Cycle | $T_{AV}$ | $T_{OUT}$ | $R_5$ | $R_{10}$ | Δ |
|---|---|---|---|---|---|
| 1 | 180,000 | 5,800 | 1 | 0 | 0 |
| 2 | 180,000 | 1,075 | 1,0 | 0,1 | 0 |
| 3 | 180,000 | 500 | 1,0,0 | 0,1,1 | 0 |
| 4 | 180,000 | 1,750 | 1,0,0,0 | 0,1,1,1 | 0 |
| 5 | 180,000 | 3,450 | 1,0,0,0,1 | 0,1,1,1,0 | 2,000 |

After cycle 5 is complete, $T_{AV}$ is set to 160,000 and R5 and R10 are reset to empty

| Cycle | $T_{AV}$ | $T_{OUT}$ | $R_5$ | $R_{10}$ | Δ |
|---|---|---|---|---|---|
| 6 | 160,000 | 1,800 | 0 | 1 | 0 |
| 7 | 160,000 | 752 | 0,0 | 1,1 | 0 |
| 8 | 160,000 | 6,500 | 0,0,1 | 1,1,0 | 0 |
| 9 | 160,000 | 456 | 0,0,1,0 | 1,1,0,1 | 0 |
| 10 | 160,000 | 312 | 0,0,1,0,0 | 1,1,0,1,1 | 0 |
| 11 | 160,000 | 800 | 0,0,1,0,0 | 1,1,0,1,1,1 | 0 |
| 12 | 160,000 | 444 | 0,0,1,0,0 | 1,1,0,1,1,1,1 | 0 |
| 13 | 160,000 | 1,654 | 0,0,0,0,0 | 1,1,0,1,1,1,1,1 | 0 |
| 14 | 160,000 | 5,500 | 0,0,0,1,0 | 1,1,1,0,1,1,1,1,1,0 | 0 |
| 15 | 160,000 | 379 | 0,0,0,1,0 | 1,1,1,0,1,1,1,1,1,0,1 | 0 |
| 16 | 160,000 | 1,250 | 0,0,0,1,0 | 1,1,1,0,1,1,1,1,1,0,1 | 0 |
| 17 | 160,000 | 654 | 0,0,0,1,0 | 1,1,1,0,1,1,1,1,1,0,1 | 0 |
| 18 | 160,000 | 521 | 0,0,0,1,0 | 1,1,1,1,1,1,1,1,1,0,1 | -2,000 |

After cycle 18 is complete, $T_{AV}$ is set to 180,000 and R5 and R10 are reset to empty

MANAGING AIR TIME FAIRNESS OF CLIENT DEVICES IN A WIRELESS NETWORK

BACKGROUND

Embodiments of the present disclosure relate to managing air time fairness (ATF) of client devices in a wireless network by managing tokens.

SUMMARY

Aspects of the present invention are drawn to a home network controller device for use with a first client device and a second client device. The home network controller device includes: a memory and a processor configured to execute instructions stored on the memory to cause the home network controller device to: establish a first wireless network for use by the first client device; establish a second wireless network for use by the second client device; establish a number of tokens for use on the first wireless network and the second wireless network over a first predetermined number of cycles of usage; establish a first airtime fairness portion of the number of tokens of the first predetermined number of cycles of usage for use on the first wireless network; establish a second airtime fairness portion of the number of tokens of the first predetermined number of cycles of usage for use on the second wireless network; decrease the number of tokens for use on the first wireless network and the second wireless network over a second predetermined number of cycles of usage when a number of unused tokens over the first predetermined number of cycles of usage is greater than a threshold, so as to establish a second number of tokens for use on the first wireless network and the second wireless network over the second predetermined number of cycles of usage; establish a first airtime fairness portion of the second number of tokens of the second predetermined number of cycles of usage for use on the first wireless network; and establish a second airtime fairness portion of the second number of tokens of the second predetermined number of cycles of usage for use on the second wireless network.

In some embodiments, the first airtime fairness portion includes a percentage of the number of tokens of the first predetermined number of cycles of usage for use on the first wireless network.

In some embodiments, the processor is further configured to execute instructions stored on the memory to additionally cause the home network controller device to: increase the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage; establish a first airtime fairness portion of the third number of tokens of the third predetermined number of cycles of usage for use on the first wireless network; and establish a second airtime fairness portion of the third number of tokens of the third predetermined number of cycles of usage for use on the second wireless network.

Other aspects of the present invention are drawn to a method of using a home network controller device with a first client device and a second client device, the method including: establishing, via a processor configured to execute instructions stored on a memory, a first wireless network for use by the first client device; establishing, via the processor, a second wireless network for use by the second client device; establishing, via the processor, a number of tokens for use on the first wireless network and the second wireless network over a first predetermined number of cycles of usage; establishing, via the processor, a first airtime fairness portion of the number of tokens of the first predetermined number of cycles of usage for use on the first wireless network; establishing, via the processor, a second airtime fairness portion of the number of tokens of the first predetermined number of cycles of usage for use on the second wireless network; decreasing, via the processor, the number of tokens for use on the first wireless network and the second wireless network over a second predetermined number of cycles of usage when a number of unused tokens over the first predetermined number of cycles of usage is greater than a threshold so as to establish a second number of tokens for use on the first wireless network and the second wireless network over the second predetermined number of cycles of usage; establishing, via the processor, a first airtime fairness portion of the second number of tokens of the second predetermined number of cycles of usage for use on the first wireless network; and establishing, via the processor, a second airtime fairness portion of the second number of tokens of the second predetermined number of cycles of usage for use on the second wireless network.

In some embodiments, the first airtime fairness portion includes a percentage of the number of tokens of the first predetermined number of cycles of usage for use on the first wireless network.

In some embodiments, the method further includes: increasing, via the processor, the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage; establishing, via the processor, a first airtime fairness portion of the third number of tokens of the third predetermined number of cycles of usage for use on the first wireless network; and establishing, via the processor, a second airtime fairness portion of the third number of tokens of the third predetermined number of cycles of usage for use on the second wireless network.

Other aspects of the present invention are drawn to a non-transitory, computer-readable media having computer-readable instructions stored thereon, the computer-readable instructions being capable of being read by a home network controller device for use with a first client device and a second client device, wherein the computer-readable instructions are capable of instructing the home network controller device to perform the method including: establishing, via a processor configured to execute instructions stored on a memory, a first wireless network for use by the first client device; establishing, via the processor, a second wireless network for use by the second client device; establishing, via the processor, a number of tokens for use on the first wireless network and the second wireless network over a first predetermined number of cycles of usage; establishing, via the processor, a first airtime fairness portion of the number of tokens of the first predetermined number of cycles of usage for use on the first wireless network; establishing, via the processor, a second airtime fairness portion of the number of tokens of the first predetermined number of cycles of usage for use on the second wireless network; decreasing, via the processor, the number of tokens for use on the first wireless network and the second wireless network over a second predetermined number of cycles of usage when a number of unused tokens over the first predetermined number of cycles of usage is greater than a threshold so as to establish a second number of tokens for use on the first wireless network and the second wireless network over the second predetermined number of cycles of usage; establishing, via the processor, a first airtime fairness portion of the second number of tokens of the second predetermined number of cycles of usage for use on the first wireless network; and establishing, via the processor, a second airtime fairness portion of the second number of tokens of the second predetermined number of cycles of usage for use on the second wireless network.

In some embodiments, the computer-readable instructions are capable of instructing the home network controller device to perform the method wherein first airtime fairness portion includes a percentage of the number of tokens of the first predetermined number of cycles of usage for use on the first wireless network.

In some embodiments, the computer-readable instructions are capable of instructing the home network controller device to perform the method further including: increasing, via the processor, the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage; establishing, via the processor, a first airtime fairness portion of the third number of tokens of the third predetermined number of cycles of usage for use on the first wireless network; and establishing, via the processor, a second airtime fairness portion of the third number of tokens of the third predetermined number of cycles of usage for use on the second wireless network.

BRIEF SUMMARY OF THE DRAWINGS

The accompanying drawings, which are incorporated in and form a part of the specification, illustrate example embodiments and, together with the description, serve to explain the principles of the present disclosure. In the drawings:

FIG. 4A. illustrates a second table with example clients and their respective token allocations for one cycle of data transmission;

FIG. 4B. illustrates a table containing the example clients of FIG. 4A and their respective token usage after the completion of one cycle;

FIG. 5 illustrates a data stream showing several data packets during one cycle of data transmission;

FIG. 9 illustrates a table detailing an example in accordance with aspects of the present disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Airtime fairness is a method used in wireless networking to regulate the amount of airtime used to transmit data frames. Airtime fairness is usually assigned by weights or percentages, but is often distributed through an algorithm using tokens.

In networking, a token is a series of bits that circulate on a token-ring network. When one of the devices on the network has the "token," it can send information to the other devices on the network. Since there is only one token for each token-ring network, only one device can send data at a time. When airtime fairness is deployed on an access point device (APD), each client connected to the APD is assigned a specified number of tokens based on a percentage of airtime allocated to that client. Before a client can send data, it must have at least one token. If the client does not have a token, the data will be deferred until the next cycle of data transmission.

An issue that occurs when deploying airtime fairness is with airtime fairness algorithms that do not take into account the airtime used by non-data frames when calculating token usage. When non-data frames such as beacon frames or management frames consume airtime, they reduce the amount of available airtime for data transmission. When the percentage of airtime for data transmission realized is significantly less than the airtime for data transmission that is expected, the result is negative quality of service issues between the customer and their service provider. This will be described in greater detail with reference to FIGS. 1-5.

Figure 1:
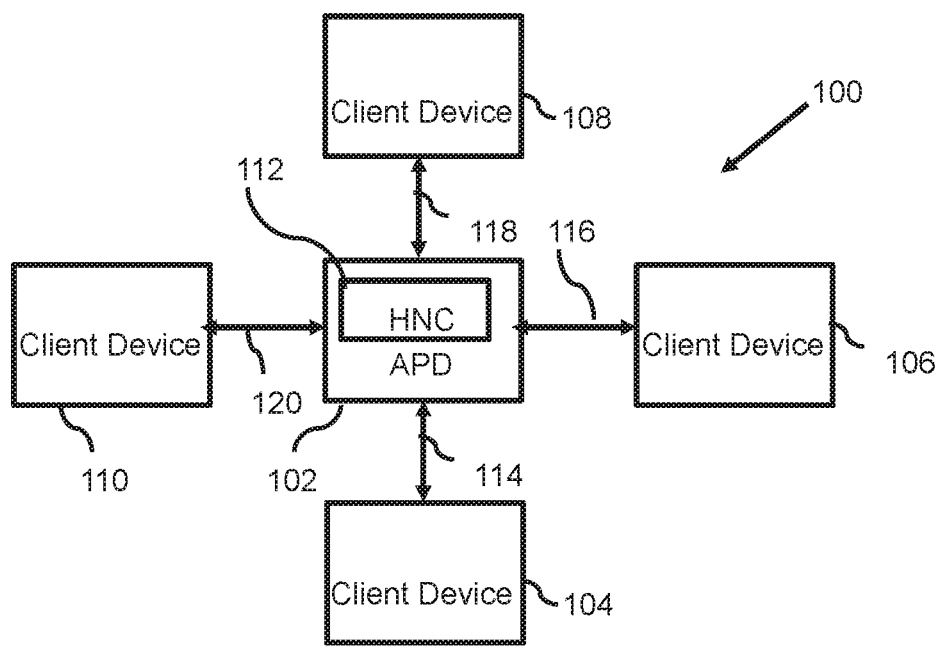
FIG. 1 illustrates structural components implementing a communications system.

FIG. 1 illustrates structural components implementing a communications system 100.

As shown in FIG. 1, communications system 100 includes: an APD 102 having a home network controller (HNC) 112 disposed therein; a plurality of client devices, a sample of which are illustrated as a client device 104, a client device 106, a client device 108, and a client device 110; and a plurality of wireless networks, a sample of which are illustrated as a wireless network 114, a wireless network 116, a wireless network 118, and a wireless network 120. For purposes of discussion, let each of wireless network 114, a wireless network 116, a wireless network 118, and a wireless network 120 be a Wi-Fi network having a distinct respective service set identifier (SSID).

A wireless access point (WAP), or more generally just access point (AP) or APD, is a networking hardware device that allows other Wi-Fi devices to connect to a network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English.

Within communications system 100, client devices are often referred to as being stations in WLAN 120. In IEEE 802.11 (Wi-Fi) terminology, a station (abbreviated as STA) is a device that has the capability to use the 802.11 protocol. For example, a station may be a laptop, a desktop PC, PDA, access point, or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

As shown in FIG. 1, APD 102 is arranged to communicate with client device 104 via wireless network 114; APD 102 is arranged to communicate with client device 106 via wireless network 116; APD 102 is arranged to communicate with client device 108 via wireless network 118; and APD 102 is arranged to communicate with client device 110 via wireless network 120.

For purposes of discussion, let wireless network 114 connected to client device 104 be a private network having a modulation coding scheme 14, or a PRV-14 network for short. Further, let wireless network 116 connected to client device 106 also be a private network, but having an MCS 10, or a PRV-10 for short. On the other hand, let wireless network 118 connected to client device 108 be a guest network having an MCS 14, or a GST-14 for short, whereas let wireless network 120 connected client device 110 additionally be a guest network, but having an MCS 10, or a GST-10 for short.

HNC 112 controls the airtime for each of client device 104, 106, 108 and 110 via tokens. For purposes of discussion only, assume that HNC 112 within APD 102 has allocated 200,000 tokens for use by client devices 104, 106, 108, and 110. Further, for purposes of discussion only, assume that 70% of the airtime has been allocated to the private networks, wireless network 114 and wireless network 116, whereas 30% of the airtime has been allocated to the guest networks, wireless network 118 and wireless network 120. This will now be discussed further with reference to FIGS. 2A-3.

Figure 2A:
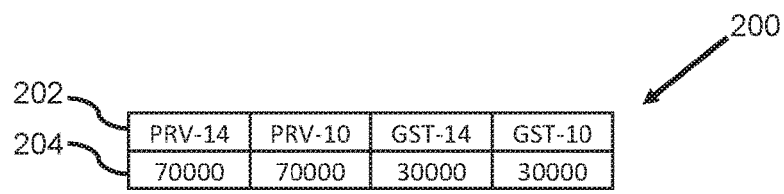
FIG. 2A illustrates a table that lists example clients and their respective token allocations for one cycle of data transmission.

FIG. 2A illustrates a table 200 having a row 202 that lists wireless networks 114, 116, 118, and 120 and a row 204 that lists corresponding token allocations for one cycle of data transmission. For example, in table 200, client device 104 on wireless network 114 (PRV-14) and client device 106 on wireless network 116 (PRV-10) are the private networks, and client device 108 on wireless network 118 (GST-14) and client device 110 on wireless network 120 (GST-10) are the guest networks.

In this example, private wireless networks 114 and 116 (PRV-14 and PRV-10, respectively) have been allocated 70% of the airtime, whereas the guest wireless networks 118 and 120 (GST-14 and GST-10, respectively) have been allocated 30% of the airtime. Therefore, client device 104 associated with private wireless network 114 (PRV-14) has an allocation of 70,000 tokens, client device 106 associated with private wireless network 116 (PRV-10) has an allocation of 70,000 tokens, client device 108 associated with guest wireless network 118 (GST-14) has an allocation of 30,000 tokens, and client device 110 associated with guest wireless network 120 (GST-10) has an allocation of 30,000 tokens.

Figure 2B:
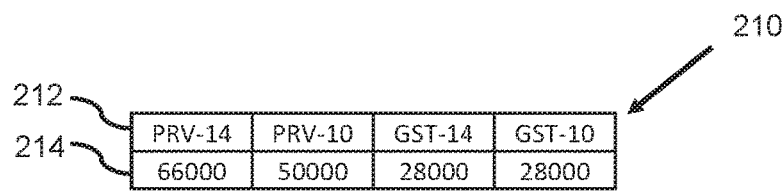
FIG. 2B illustrates a table containing the example clients of FIG. 2A and their respective token usage after the completion of one cycle.

FIG. 2B illustrates a table 210 having a row 212 that lists the example clients of FIG. 2A and a row 214 that lists their respective token usage after the completion of one cycle. As shown in the figure, in table 210, client device 104 associated with private wireless network 114 (PRV-14) has used 66,000 tokens in one cycle, client device 106 associated with private wireless network 116 (PRV-10) has used 50,000 tokens in one cycle, client device 108 associated with guest wireless network 118 (GST-14) has used 28,000 tokens in one cycle, and client device 110 associated with guest wireless network 120 (GST-10) has used 28,000 tokens in one cycle.

In this example, the total airtime used to transmit data by the private networks includes the airtime of client device 104 associated with private wireless network 114 (PRV-14) and client device 106 associated with private wireless network 116 (PRV-10) is (66,000+50,000)/200,000, or 58% of the airtime. Accordingly, the private wireless networks did not receive the allotted 70% of the airtime.

On the other hand, the total airtime used to transmit data by the guest networks includes the airtime of client device 108 associated with guest wireless network 118 (GST-14) and client device 110 associated with guest wireless network 120 (GST-10) is (28,000+28,000)/200,000, or 28% of the airtime. Accordingly, the guest wireless networks did not receive the allotted 30% of the airtime.

The remaining 14% of airtime during this cycle was used by management frames and control frames. This means that a significant percentage of the airtime during this cycle was not used for transmitting data.

Figure 3:
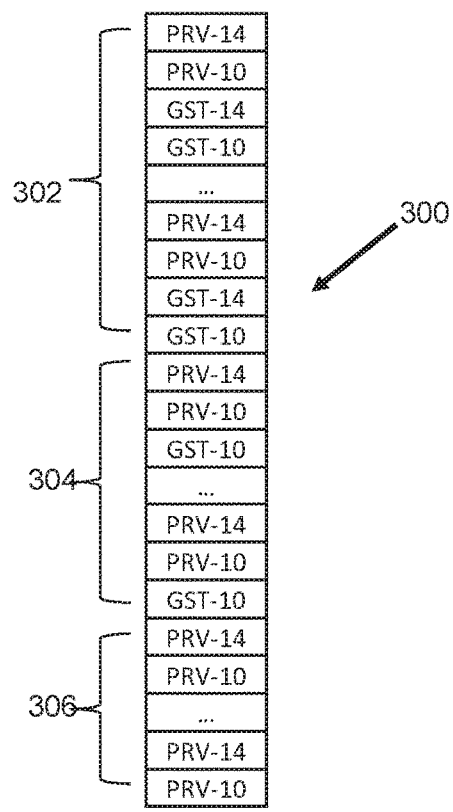
FIG. 3 illustrates a data stream showing several data packets during one cycle of data transmission.

FIG. 3 illustrates a data stream 300 illustrating the clients of FIGS. 2A and 2B that are transmitting data at three different times during one cycle. Section 302 illustrates which clients are transmitting data at the beginning of the cycle. For example, client device 104 associated with private wireless network 114 (PRV-14), client device 106 associated with private wireless network 116 (PRV-10), client device 108 associated with guest wireless network 118 (GST-14), and client device 110 associated with guest wireless network 120 (GST-10) are all transmitting data at the beginning of the cycle. Section 304 illustrates which clients are transmitting data during the middle of the cycle. For example, client device 104 associated with private wireless network 114 (PRV-14), client device 106 associated with private wireless network 116 (PRV-10), and client device 110 associated with guest wireless network 120 (GST-10) are transmitting data during the middle of the cycle. Client device 108 associated with guest wireless network 118 (GST-14) cannot transmit data during the middle of the cycle because it does not have any remaining tokens to transmit data. Section 306 illustrates which clients are transmitting data at the end of the cycle. For example, client device 110 associated with guest wireless network 120 (GST-10) and client device 108 associated with guest wireless network 118 (GST-14) cannot transmit data during the end of the cycle because they do not have any remaining tokens to transmit data. Client device 104 associated with private wireless network 114 (PRV-14) and client device 106 associated with private wireless network 116 (PRV-10) are transmitting data at the end of the cycle, and they have excess tokens left over at the end of the cycle.

As another example, and for purposes of discussion only, assume that HNC 112 within APD 102 has allocated 170,000 tokens for use by client devices 104, 106, 108, and 110. Further, for purposes of discussion only, assume that 70% of the airtime has been allocated to the private networks, wireless network 114 and wireless network 116, whereas 30% of the airtime has been allocated to the guest networks, wireless network 118 and wireless network 120. This will now be discussed further with reference to FIGS. 4A-5.

FIG. 4A illustrates a table 400 having a row 402 that lists wireless networks 114, 116, 118, and 120 and a row 404 that lists respective token allocations for one cycle of data transmission. For example, in table 400, client device 104 on wireless network 114 (PRV-14) and client device 106 on wireless network 116 (PRV-10) are the private networks, and client device 108 on wireless network 118 (GST-14) and client device 110 on wireless network 120 (GST-10) are the guest networks.

In this example, private wireless networks 114 and 116 (PRV-14 and PRV-10, respectively) have been allocated 70% of the airtime, whereas the guest wireless networks 118 and 120 (GST-14 and GST-10, respectively) have been allocated 30% of the airtime. Therefore, client device 104 associated with private wireless network 114 (PRV-14) has an allocation of 59,500 tokens, client device 106 associated with private wireless network 116 (PRV-10) has an allocation of 59,500 tokens, client device 108 associated with guest wireless network 118 (GST-14) has an allocation of 25,500 tokens, and client device 110 associated with guest wireless network 120 (GST-10) has an allocation of 25,500 tokens.

FIG. 4B illustrates a table 410 having a row 412 that lists the example clients of FIG. 4A and a row 414 that lists their respective token usage after the completion of one cycle. As shown in the figure, in table 410, client device 104 associated with private wireless network 114 (PRV-14) has used 57,800 tokens in one cycle, client device 106 associated with private wireless network 116 (PRV-10) has used 57,800 tokens in one cycle, client device 108 associated with guest wireless network 118 (GST-14) has used 22,100 tokens in one cycle, and client device 110 associated with guest wireless network 120 (GST-10) has used 23,800 tokens in one cycle.

In this example, the total airtime used to transmit data by the private networks includes the airtime of client device 104 associated with private wireless network 114 (PRV-14) and client device 106 associated with private wireless network 116 (PRV-10) is (57,800+57,800)/170,000, or 68% of the airtime. Accordingly, the private wireless networks did not receive the allotted 70% of the airtime.

On the other hand, the total airtime used to transmit data by the guest networks includes the airtime of client device 108 associated with guest wireless network 118 (GST-14) and client device 110 associated with guest wireless network 120 (GST-10) is (22,100+23,800)/170,000, or 27% of the airtime. Accordingly, the guest wireless networks did not receive the allotted 30% of the airtime.

The remaining 5% of airtime during this cycle was used by management frames and control frames. While this percentage is better than that of the example of FIGS. 2A-3, it still represents a significant percentage of airtime that is used for non-data frames during one cycle.

FIG. 5 illustrates a data stream 500 illustrating the clients of FIGS. 4A and 4B that are transmitting data at four different times during one cycle. Section 502 illustrates which clients are transmitting data at the beginning of the cycle. Client device 104 associated with private wireless network 114 (PRV-14), client device 106 associated with private wireless network 116 (PRV-10), client device 108 associated with guest wireless network 118 (GST-14), and client device 110 associated with guest wireless network 120 (GST-10) are all transmitting data at the beginning of the cycle.

Section 504 illustrates which clients are transmitting data during the first middle portion of the cycle. Client device 104 associated with private wireless network 114 (PRV-14), client device 106 associated with private wireless network 116 (PRV-10), and client device 110 associated with guest wireless network 120 (GST-10) are transmitting data during the first middle portion of the cycle. Client device 108 associated with guest wireless network 118 (GST-14) cannot transmit data during the first middle portion of the cycle because it does not have any remaining tokens to transmit data.

Section 506 illustrates which clients are transmitting data during the second middle portion of the cycle. Client device 104 associated with private wireless network 114 (PRV-14) and client device 106 associated with private wireless network 116 (PRV-10) are transmitting data during the second middle portion of the cycle. Client device 110 associated with guest wireless network 120 (GST-10) and client device 108 associated with guest wireless network 118 (GST-14) cannot transmit data during the second middle portion of the cycle because they do not have any remaining tokens to transmit data.

Section 508 illustrates which clients are transmitting data at the end of the cycle. For example, client device 106 associated with private wireless network 116 (PRV-10) is transmitting data at the end of the cycle. Client device 104 associated with private wireless network 114 (PRV-14), client device 108 associated with guest wireless network 118 (GST-14), and client device 110 associated with guest wireless network 120 (GST-10) cannot transmit data at the end of the cycle because they do not have any remaining tokens to transmit data.

What is needed is a system and method for dynamically adjusting the number of total available tokens per cycle to minimize the number of unused tokens after each cycle, and in doing so, this will ensure that most of the airtime per cycle is used for data transmission.

A system and method in accordance with the present disclosure provides an algorithm that dynamically adjusts the total number of available tokens on an APD during one cycle based on a measurement of the unused tokens after a predetermined number of previous cycles.

In accordance with the present disclosure, during a first cycle, the total number of unused tokens for the clients connected to an APD is measured and recorded as to whether this number is above or below a predetermined threshold. Then, during subsequent cycles, the total number of unused tokens is again measured and recorded as to whether this number is above or below a predetermined threshold. This process is repeated until the total number of unused tokens has fallen above or below the predetermined threshold within a specified number of cycles. When this happens, the total available tokens on the network are adjusted by a predetermined amount.

An example system and method for dynamically adjusting the total number of available tokens in a network in accordance with aspects of the present disclosure will now be described in greater detail with reference to FIGS. 6-9.

Figure 6:
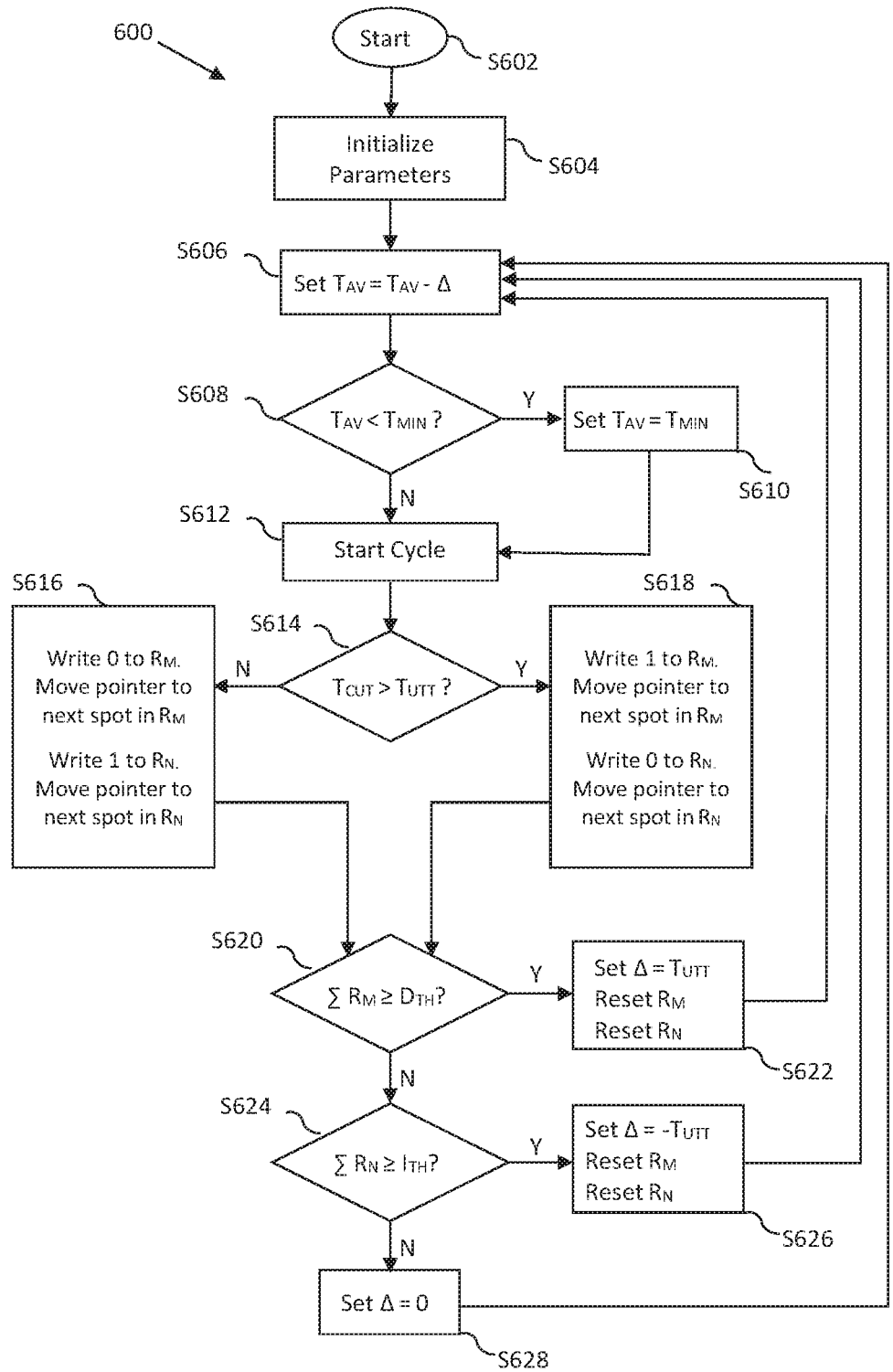
FIG. 6 illustrates an example algorithm for adjusting the total amount of allocated tokens during one cycle of transmission in a communications system in accordance with aspects of the present disclosure.

FIG. 6 illustrates an example algorithm 600 for adjusting the total amount of allocated tokens during one cycle of transmission in a communications system in accordance with aspects of the present disclosure.

The following variables are used in algorithm 600. $T_{AV}$ is the number of total available tokens per cycle. $T_{CUT}$ is the number of unused tokens after the completion of one cycle. $\Delta$ is the amount to change $T_{AV}$ by. $T_{MIN}$ is the baseline minimum number of total available tokens per cycle. $T_{UTT}$ is the unused token threshold. $R_M$ is a buffer of length M that holds a count of the number of times $T_{CUT}$ is greater than $T_{UTT}$. $D_{TH}$ is the threshold for the number of times $T_{CUT}$ must be greater than $T_{UTT}$ in order to decrease $T_{AV}$. $R_N$ is a buffer of length N that holds a count of the number of times $T_{CUT}$ is less than $T_{UTT}$. $I_{TH}$ is the threshold for the number of times $T_{CUT}$ must be less than $T_{UTT}$ in order to increase $T_{AV}$.

This will be described in more detail with respect to FIGS. 7-9.

Figure 7:
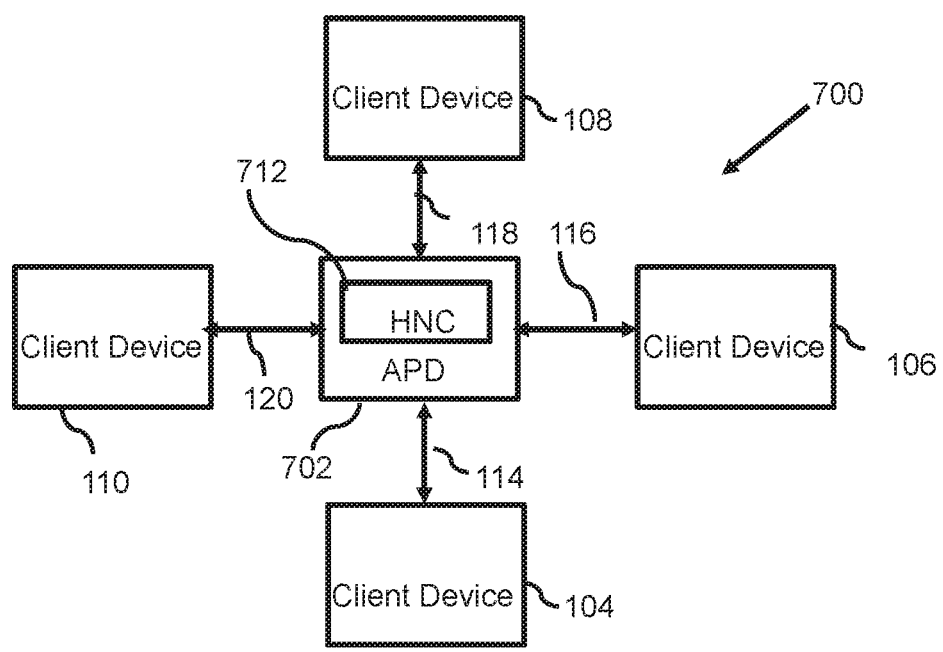
FIG. 7 illustrates a communications system in accordance with aspects of the present disclosure.

FIG. 7 illustrates structural components implementing a communication system 700 in accordance with aspects of the present disclosure.

As shown in the figure, communication system 700 includes: an APD 702 having an HNC 712 disposed therein; a plurality of client devices, a sample of which are illustrated as client device 104, client device 106, client device 108, and client device 110; and a plurality of wireless networks, a sample of which are illustrated as wireless network 114, wireless network 116, wireless network 118, and wireless network 120. For purposes of discussion, let each of wireless network 114, wireless network 116, wireless network 118, and wireless network 120 be a Wi-Fi network having a distinct respective service set identifier (SSID).

As shown in FIG. 7, APD 702 is arranged to communicate with client device 104 via wireless network 114; APD 702 is arranged to communicate with client device 106 via wireless network 116; APD 702 is arranged to communicate with client device 108 via wireless network 118; and APD 702 is arranged to communicate with client device 110 via wireless network 120.

Figure 8:
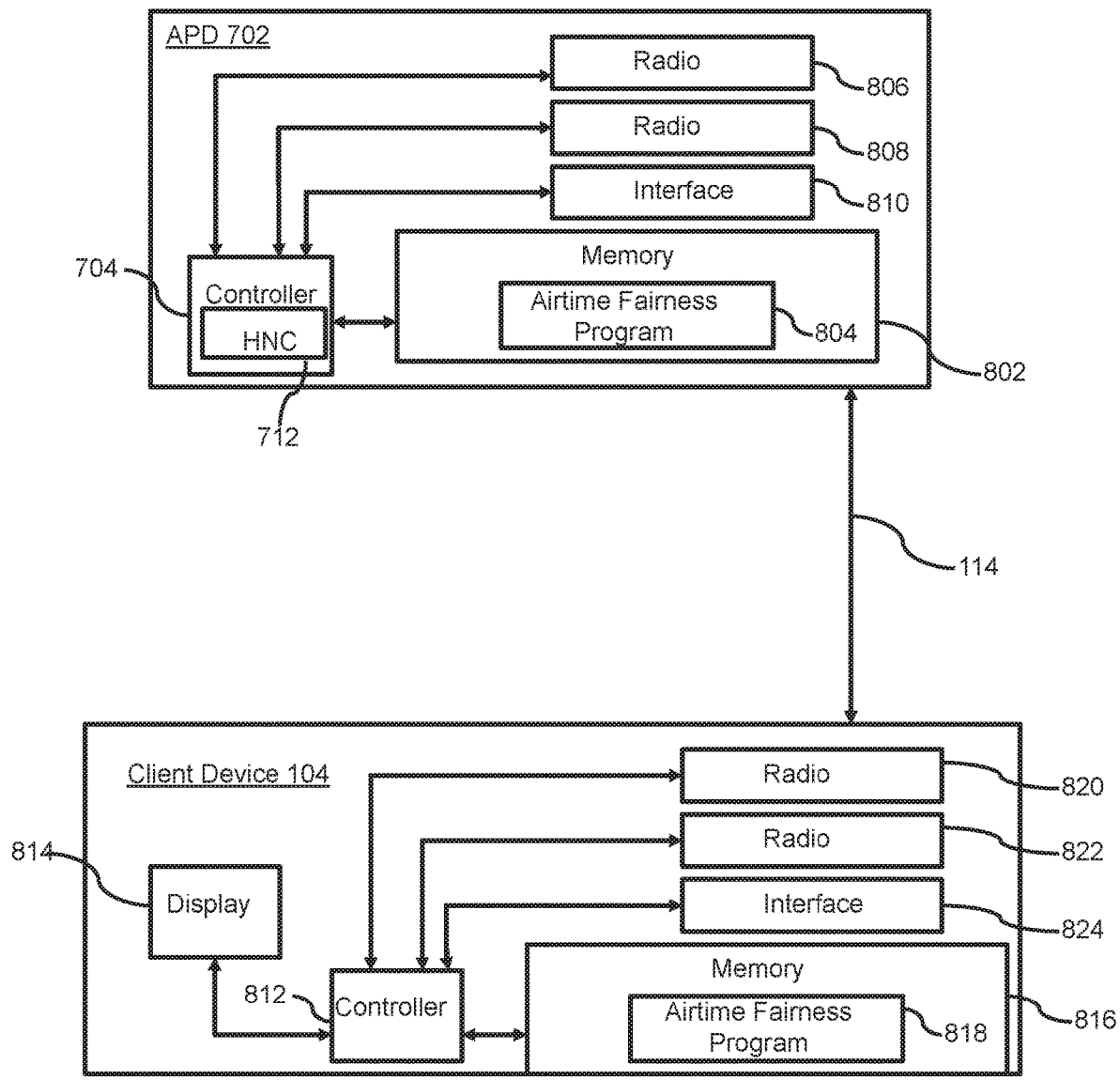
FIG. 8 illustrates an exploded view of a gateway device and a client device in accordance with aspects of the present disclosure.

FIG. 8 illustrates an exploded view of APD 702 and client device 104 of FIG. 7.

As shown in FIG. 8, APD 702 includes: a controller 704, which has stored thereon an HNC 712; a memory 802, which has stored thereon an airtime fairness program 804; a radio 806; a radio 808; and an interface circuit 810.

In this example, controller 704, memory 802, radio 806, radio 808, and interface circuit 810 are illustrated as individual devices. However, in some embodiments, at least two of controller 704, memory 802, radio 806, radio 808, and interface circuit 810 may be combined as a unitary device. Whether as individual devices or as combined devices, controller 704, memory 802, radio 806, radio 808, and interface circuit 810 may be implemented as any combination of an apparatus, a system, and an integrated circuit. Further, in some embodiments, at least one of controller 704, memory 802, and interface circuit 810 may be implemented as a computer having non-transitory computer-readable media for carrying or having computer-executable instructions or data structures stored thereon. Such non-transitory computer-readable recording medium refers to any computer program product, apparatus, or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data, or some combination thereof, may include an implementation of a networking environment. The program modules generally carry out the functions and/or methodologies of various embodiments of the application as described herein.

Controller 704 can be a hardware processor, such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of APD 702 in accordance with the embodiments described in the present disclosure.

Memory 802 can store various programming, and user content, and data including airtime fairness program 804. In example embodiments, as will be described in more detail below, airtime fairness program 804 includes instructions, that when executed by HNC 712, enable APD 702 to establish a wireless network, e.g., wireless network 114, for use by a client device, e.g., client device; establish a second wireless network, e.g., wireless network 116, for use by a second client device, e.g., client device 106; establish a number of tokens for use on the first wireless network and the second wireless network over a first predetermined number of cycles of usage; establish a first airtime fairness portion of the number of tokens of the first predetermined number of cycles of usage for use on the first wireless network; establish a second airtime fairness portion of the number of tokens of the first predetermined number of cycles of usage for use on the second wireless network; decrease the number of tokens for use on the first wireless network and the second wireless network over a second predetermined number of cycles of usage when a number of unused tokens over the first predetermined number of cycles of usage is greater than a threshold, so as to establish a second number of tokens for use on the first wireless network and the second wireless network over the second predetermined number of cycles of usage; establish a first airtime fairness portion of the second number of tokens of the second predetermined number of cycles of usage for use on the first wireless network; and establish a second airtime fairness portion of the second number of tokens of the second predetermined number of cycles of usage for use on the second wireless network.

In some of these example embodiments, as will be described in more detail below, airtime fairness program 804 includes instructions, that when executed by HNC 712, enable APD 702 to establish the first airtime fairness portion to comprise a percentage of the number of tokens of the first predetermined number of cycles of usage for use on the first wireless network.

In some other of these example embodiments, as will be described in more detail below, airtime fairness program 804 includes instructions, that when executed by HNC 712, enable APD 702 to additionally increase the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage; establish a first airtime fairness portion of the third number of tokens of the third predetermined number of cycles of usage for use on the first wireless network; and establish a second airtime fairness portion of the third number of tokens of the third predetermined number of cycles of usage for use on the second wireless network.

Interface circuit 810 can include one or more connectors, such as RF connectors, or Ethernet connectors, and/or wireless communication circuitry, such as 5G circuitry and one or more antennas. Interface circuit 810 receives content from a content provider by known methods, non-limiting examples of which include terrestrial antenna, satellite dish, wired cable, DSL, optical fibers, or 5G as discussed above. Through interface circuit 810, APD 702 receives an input signal, including data and/or audio/video content, from a content provider and can send data to a content provider.

Radio 806 and radio 808, (and in some cases, additional radios), may also be referred to as a wireless communication circuit, such as a Wi-Fi WLAN interface radio transceiver, and is operable to communicate with client devices 104, 106, 108, and 110. Radio 806 and 808 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 702 can also be equipped with a radio transceiver/wireless communication circuit to implement a wireless network in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Client device 104 includes: a controller 812; a display 814; a memory 816, which has stored thereon an airtime fairness program 818; a radio 820; a radio 822; and an interface circuit 824.

In this example, controller 812, display 814, memory 816, radio 820, radio 822, and interface circuit 824 are illustrated as individual devices. However, in some embodiments, at least two of controller 812, display 814, memory 816, radio 820, radio 822, and interface circuit 824 may be combined as a unitary device. Further, in some embodiments, at least one of controller 812 and memory 816 may be implemented as a computer having tangible computer-readable media for carrying or having computer-executable instructions or data structures stored thereon.

Controller 812, which can include hardware circuitry such as a dedicated control circuit, CPU, microprocessor, etc., controls the circuits of client device 104.

Memory 816 can store various programming, and user content, and data including airtime fairness program 818. In some embodiments, as will be described in greater detail below, airtime fairness program 818 includes instructions, that when executed by controller 812, enable client device 104 to use allotted tokens when communicating with other devices within communication system 700.

Radio 820 and radio 822 may include a Wi-Fi WLAN interface radio transceiver that is operable to communicate with client devices 106, 108, and 110, and APD 702 as shown in FIG. 7, and also may include a cellular transceiver operable to communicate with a mobile service provider through a wireless network. Radio 820 and radio 822 include one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols.

As will be described in more detail below, memory 802 contains instructions that may be used by HNC 712 to cause APD 702 to establish a first wireless network for use by client device 104; establish a second wireless network for use by client device 106; establish a number of tokens for use on the first wireless network and the second wireless network over a first predetermined number of cycles of usage; establish a first airtime fairness portion of the number of tokens of the first predetermined number of cycles of usage for use on the first wireless network; establish a second airtime fairness portion of the number of tokens of the first predetermined number of cycles of usage for use on the second wireless network; decrease the number of tokens for use on the first wireless network and the second wireless network over a second predetermined number of cycles of usage when a number of unused tokens over the first predetermined number of cycles of usage is greater than a threshold, so as to establish a second number of tokens for use on the first wireless network and the second wireless network over the second predetermined number of cycles of usage; establish a first airtime fairness portion of the second number of tokens of the second predetermined number of cycles of usage for use on the first wireless network; and establish a second airtime fairness portion of the second number of tokens of the second predetermined number of cycles of usage for use on the second wireless network.

As will be described in more detail below, HNC 712 is additionally configured so that the first airtime fairness portion includes a percentage of the number of tokens of the first predetermined number of cycles of usage for use on the first wireless network.

As will be described in more detail below, HNC 712 is additionally configured to execute instructions stored on memory 802 to additionally cause HNC 712 to: increase the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage; establish a first airtime fairness portion of the third number of tokens of the third predetermined number of cycles of usage for use on the first wireless network; and establish a second airtime fairness portion of the third number of tokens of the third predetermined number of cycles of usage for use on the second wireless network.

FIG. 9 illustrates a table 900 detailing an example in accordance with aspects of the present disclosure. Within table 900 is a column 902 listing 18 cycles of data transmission from an APD to connected client devices; a column 904 listing the total available tokens at the beginning of each cycle; a column 906 listing the unused tokens after each cycle; a column 908 listing the data stored in buffer R5, a buffer of length 5; a column R10 listing the data stored in buffer R10, a buffer of length 10; and a column 912, listing Δ at the end of every cycle.

Returning to FIG. 6, as shown in the figure, algorithm 600 to be executed by a processor starts (S602), and the parameters are initialized (S604). For example, returning to FIG. 8, APD 702 starts the algorithm and initializes the parameters. For example, returning to FIG. 9, the algorithm begins, and the following parameters are initialized: R5 is set to empty, R10 is set to empty, $T_{UTT}$ is set to 2,000, $T_{AV}$ is set to 180,000, and Δ is set to 0.

Returning to FIG. 6, after the parameters are initialized (S604), the total available tokens, $T_{AV}$, is set to equal $T_{AV}$ minus Δ (S606), where A is a predetermined amount by which to adjust the total available tokens. For example, returning to FIG. 8, APD 702 sets $T_{AV}$ equal to $T_{AV}$ minus Δ. For example, returning to FIG. 9, $T_{AV}$ is set to 180,000 minus 0, which equals 180,000.

Returning to FIG. 6, after the total available tokens, $T_{AV}$, are set to equal $T_{AV}$ minus Δ (S606), it is determined whether or not $T_{AV}$ is less than $T_{MIN}$, the baseline total number of available tokens (S608). For example, returning to FIG. 8, APD 702 determines whether or not $T_{AV}$ is less than $T_{MIN}$. For example, returning to FIG. 9, $T_{MIN}$ is 150,000. Since 180,000 is greater than 150,000, it is determined that $T_{AV}$ is not less than $T_{MIN}$.

Returning to FIG. 6, if it is determined that $T_{AV}$ is less than $T_{MIN}$ (Y at S608), $T_{AV}$ is set to the value of $T_{MIN}$ (S610). For example, returning to FIG. 8, if APD 702 determines that $T_{AV}$ is less than $T_{MIN}$, $T_{AV}$ is set to the value of $T_{MIN}$.

Returning to FIG. 6, if $T_{AV}$ is set to the value of $T_{MIN}$ (S610), a cycle is started with $T_{AV}$ equal to $T_{MIN}$ (S612). For example, returning to FIG. 8, if $T_{AV}$ set to the value of $T_{MIN}$, APD 702 starts a cycle with $T_{AV}$ equal to $T_{MIN}$.

Returning to FIG. 6, if it is determined that $T_{AV}$ is not less than $T_{MIN}$ (N at S608), a cycle is started with no change to the value of $T_{AV}$ (S612). For example, returning to FIG. 8, if APD 702 determines that $T_{AV}$ is not less than $T_{MIN}$, a cycle is started with no change to the value of $T_{AV}$.

Returning to FIG. 6, after a cycle has started (S612), it is determined if the unused tokens, $T_{CUT}$, are greater than the unused token threshold, $T_{UTT}$ (S614). For example, returning to FIG. 8, after a cycle has started, APD 702 determines if the unused tokens are greater than the unused token threshold. For example, returning to FIG. 9, after each cycle has started, a determination is made whether or not the unused tokens, TOUT, are greater than $T_{UTT}$, the unused token threshold, which is 2,000 in FIG. 9. As can be seen in table 900, in cycles 1, 5, 8, and 14, $T_{CUT}$ is greater than $T_{UTT}$.

Returning to FIG. 6, if it is determined that the unused tokens, $T_{CUT}$, are not greater than the unused token threshold, $T_{UTT}$ (N at S614), then 0 is written to $R_M$, a buffer of length M that holds a count of the number of times $T_{CUT}$ is greater than $T_{UTT}$. Then the pointer in $R_M$ is advanced to the next slot in $R_M$ to prepare for the next cycle. In addition, 1 is written to $R_N$, a buffer of length N that holds a count of the number of times $T_{CUT}$ is not greater than $T_{UTT}$. Then the pointer in $R_N$ is advanced to the next slot in $R_N$ to prepare for the next cycle (S616).

For example, returning to FIG. 9, as shown in table 900, for cycles 2, 3, 4, 6, 7, 9, 10, 11, 12, 13, 15, 16, 17, and 18, $T_{CUT}$ is not greater than $T_{UTT}$. Therefore, during cycles 2, 3, 4, 6, 7, 9, 10, 11, 12, 13, 15, 16, 17, and 18, a 0 is written to R5, and a 1 is written to R10. During a cycle, after data is written to both R5 and R10, the pointer in R5 and the pointer in R10 are each moved to the next spot in their respective buffers in preparation for the next cycle.

Returning to FIG. 6, if it is determined that the unused tokens, $T_{CUT}$, are greater than the unused token threshold, $T_{UTT}$ (Y at S614), then 1 is written to $R_M$, a buffer of length M that holds a count of the number of times $T_{CUT}$ is greater than $T_{UTT}$. Then the pointer in $R_M$ is advanced to the next slot in $R_M$ to prepare for the next cycle. In addition, 0 is written to $R_N$, a buffer of length N that holds a count of the number of times $T_{CUT}$ is not greater than $T_{UTT}$. Then the pointer in $R_N$ is advanced to the next slot in $R_N$ to prepare for the next cycle (S618).

For example, returning to FIG. 9, as shown in table 900, for cycles 1, 5, 8, and 14, $T_{CUT}$ is greater than $T_{UTT}$. Therefore, during cycles 1, 5, 8, and 14, a 1 is written to R5 and a 0 is written to R10. After data is written to both R5 and R10, the pointer in R5 and the pointer in R10 are each moved to the next spot in their respective buffers in preparation for the next cycle.

Returning to FIG. 6, after 0 has been written to $R_M$ and 1 has been written to $R_N$ (S616), or after 1 has been written to $R_M$ and 0 has been written to $R_N$ (S618), a sum is taken of the data in $R_M$. Then it is determined if the sum of the data in $R_M$ is greater than or equal to $D_{TH}$, where $D_{TH}$ is the threshold for the number of times $T_{CUT}$ must be greater than $T_{UTT}$ in order to decrease the number of tokens (S620).

For example, returning to FIG. 9, $D_{TH}$ is equal to 2. As shown in table 900, for each cycle, a sum is taken of the data in R5. It is then determined if the sum of the data in R5 is greater than or equal to $D_{TH}$. In cycle 5, the sum of the data in R5 equals 2, which is equal to $D_{TH}$. In cycles 1-4 and cycles 6-18, the sum of the data in R5 is equal to 1, which is less than $D_{TH}$.

Returning to FIG. 6, if the sum of the data in $R_M$ is greater than or equal to $D_{TH}$ (Y at S620), then Δ is set to $T_{UTT}$ and $R_M$ and $R_N$ are reset (S622).

For example, returning to FIG. 9, as shown in table 900, in cycle 5, the sum of the data in R5 is 2, which is equal to $D_{TH}$. Therefore, delta is set to 2,000, and R5 and R10 are reset at the end of cycle 5.

Returning to FIG. 6, after Δ is set to $T_{UTT}$ and $R_M$ and $R_N$ are reset (S622), then $T_{AV}$ is set to $T_{AV}$ minus Δ, which results in a decrease in the total available tokens (S606).

For example, returning to FIG. 9, as shown in table 900, after Δ is set to 2,000 in cycle 5, and R5 and R10 are reset, then the total available tokens are set to 160,000, which is a decrease in the total available tokens.

Returning to FIG. 6, if it is determined that the sum of the data in $R_M$ is not greater than or equal to $D_{TH}$ (N at S620), then it is determined if the sum of the data in $R_N$ is greater than or equal to $I_{TH}$, where $I_{TH}$ is the threshold for the number of times $T_{CUT}$ must be less than $T_{UTT}$ in order to increase the number of tokens (S624).

For example, returning to FIG. 9, $I_{TH}$ is equal to 9. As shown in table 900, for each cycle, a sum is taken of the data in R10. It is then determined if the sum of the data in R10 is greater than or equal to $I_{TH}$. In cycle 1, the sum of the data in R10 is 0. In cycles 2 and 6, the sum of the data in R10 is 1. In cycles 3, 7 and 8, the sum of the data in R10 is 2. In cycles 4, 5 and 9, the sum of the data in R10 is 3. In cycle 10, the sum of the data in R10 is 4. In cycle 11, the sum of the data in R10 is 5. In cycle 12, the sum of the data in R10 is 6. In cycles 13 and 14, the sum of the data in R10 is 7. In cycles 15, 16 and 17, the sum of the data in R10 is 8. In cycle 18, the sum of the data in R10 equals 9, which is equal to $I_{TH}$.

Returning to FIG. 6, if the sum of the data in $R_N$ is greater than or equal to $I_{TH}$ (Y at S624), then Δ is set to negative $T_{UTT}$ and $R_M$ and $R_N$ are reset (S626).

For example, returning to FIG. 9, as shown in table 900, in cycle 18, the sum of the data in R10 is 9, which is equal to $I_{TH}$. Therefore, Δ is set to negative 2,000, and R5 and R10 are reset at the end of cycle 18.

Returning to FIG. 6, after Δ is set to negative $T_{UTT}$ and $R_M$ and $R_N$ are reset (S626), then $T_{AV}$ is set to $T_{AV}$ minus minus Δ, which is $T_{AV}$ plus Δ, which results in an increase in the total available tokens (S606).

For example, returning to FIG. 9, as shown in table 900, after Δ is set to negative 2,000 in cycle 18 and R5 and R10 are reset, then the total available tokens are set to 180,000, which is an increase in the total available tokens.

Returning to FIG. 6, if the sum of the data is $R_M$ is not greater than or equal to $D_{TH}$ (N at S620), and the sum of the data in $R_N$ is not greater than or equal to $I_{TH}$ (N at S624), then Δ is set to 0 (S628). For example, as shown in FIG. 9, in table 900, at the end of cycles 1 to 4 and 6 to 17, Δ is set to 0.

Returning to FIG. 6, if Δ is set to 0, then the total available tokens remain unchanged (S606). For example, as shown in FIG. 9, in table 900, for cycles 1 to 4 and 6 to 17, the total available tokens at the beginning of the next cycle remains unchanged.

Airtime fairness is a method used in wireless networking to regulate the amount of airtime used to transmit data frames. Airtime fairness is usually assigned by weights or percentages, but is often distributed through an algorithm using tokens. An important issue with deploying airtime fairness is that the current airtime fairness algorithm does not take into account the airtime used by non-data frames when calculating token usage. When the percentage of airtime allocated to a client is significantly different from the airtime realized by that client, that client will have tokens left over after the completion of a cycle which indicates that the client was not able to use its allocated airtime as expected.

A system and method in accordance with the present disclosure provides an algorithm that dynamically adjusts the total number of available tokens on an APD during one cycle based on a measurement of a client's unused tokens after a predetermined number of previous cycles. The benefit of this invention is that when the total number of available tokens on an APD is based on actual token usage, then there will not be large discrepancies between allocated airtime and actual airtime used (as measured by how many tokens are unused after each cycle), and this will result in an improved user experience, reduced quality of service issues, and a satisfied customer.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A home network controller device for use with a first client device and a second client device, said home network controller device comprising:
    a memory; and
    a processor configured to execute instructions stored on said memory to cause said home network controller device to:
    establish a first wireless network for use by the first client device;
    establish a second wireless network for use by the second client device;
    establish a number of tokens for use on the first wireless network and the second wireless network over a first predetermined number of cycles of usage;
    establish a first airtime fairness portion of the number of tokens of the first predetermined number of cycles of usage for use on the first wireless network;
    establish a second airtime fairness portion of the number of tokens of the first predetermined number of cycles of usage for use on the second wireless network;
    decrease the number of tokens for use on the first wireless network and the second wireless network over a second predetermined number of cycles of usage when a number of unused tokens over the first predetermined number of cycles of usage is greater than a threshold, so as to establish a second number of tokens for use on the first wireless network and the second wireless network over the second predetermined number of cycles of usage;
    establish a first airtime fairness portion of the second number of tokens of the second predetermined number of cycles of usage for use on the first wireless network; and
    establish a second airtime fairness portion of the second number of tokens of the second predetermined number of cycles of usage for use on the second wireless network.

2. The home network controller device of claim 1, wherein the first airtime fairness portion comprises a percentage of the number of tokens of the first predetermined number of cycles of usage for use on the first wireless network.

3. The home network controller device of claim 1, wherein the processor is further configured to execute instructions stored on said memory to additionally cause said home network controller device to:
    increase the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage;
    establish a first airtime fairness portion of the third number of tokens of the third predetermined number of cycles of usage for use on the first wireless network; and
    establish a second airtime fairness portion of the third number of tokens of the third predetermined number of cycles of usage for use on the second wireless network.

4. A method of using a home network controller device with a first client device and a second client device, said method comprising:
    establishing, via a processor configured to execute instructions stored on a memory, a first wireless network for use by the first client device;
    establishing, via the processor, a second wireless network for use by the second client device;
    establishing, via the processor, a number of tokens for use on the first wireless network and the second wireless network over a first predetermined number of cycles of usage;
    establishing, via the processor, a first airtime fairness portion of the number of tokens of the first predetermined number of cycles of usage for use on the first wireless network;
    establishing, via the processor, a second airtime fairness portion of the number of tokens of the first predetermined number of cycles of usage for use on the second wireless network;
    decreasing, via the processor, the number of tokens for use on the first wireless network and the second wireless network over a second predetermined number of cycles of usage when a number of unused tokens over the first predetermined number of cycles of usage is greater than a threshold so as to establish a second number of tokens for use on the first wireless network and the second wireless network over the second predetermined number of cycles of usage;
    establishing, via the processor, a first airtime fairness portion of the second number of tokens of the second predetermined number of cycles of usage for use on the first wireless network; and
    establishing, via the processor, a second airtime fairness portion of the second number of tokens of the second predetermined number of cycles of usage for use on the second wireless network.

5. The method of claim 4, wherein first airtime fairness portion comprises a percentage of the number of tokens of the first predetermined number of cycles of usage for use on the first wireless network.

6. The method of claim 4, further comprising:
    increasing, via the processor, the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage;
    establishing, via the processor, a first airtime fairness portion of the third number of tokens of the third predetermined number of cycles of usage for use on the first wireless network; and
    establishing, via the processor, a second airtime fairness portion of the third number of tokens of the third predetermined number of cycles of usage for use on the second wireless network.

7. A tangible non-transitory, computer-readable media of a home network controller device having computer-readable instructions stored thereon, the computer-readable instructions when executed by one or more processors of the home network controller device cause the one or more processors to perform one or more operations comprising:

establishing, via a processor configured to execute instructions stored on a memory, a first wireless network for use by a first client device;

establishing, via the processor, a second wireless network for use by a second client device;

establishing, via the processor, a number of tokens for use on the first wireless network and the second wireless network over a first predetermined number of cycles of usage;

establishing, via the processor, a first airtime fairness portion of the number of tokens of the first predetermined number of cycles of usage for use on the first wireless network;

establishing, via the processor, a second airtime fairness portion of the number of tokens of the first predetermined number of cycles of usage for use on the second wireless network;

decreasing, via the processor, the number of tokens for use on the first wireless network and the second wireless network over a second predetermined number of cycles of usage when a number of unused tokens over the first predetermined number of cycles of usage is greater than a threshold so as to establish a second number of tokens for use on the first wireless network and the second wireless network over the second predetermined number of cycles of usage;

establishing, via the processor, a first airtime fairness portion of the second number of tokens of the second predetermined number of cycles of usage for use on the first wireless network; and establishing, via the processor, a second airtime fairness portion of the second number of tokens of the second predetermined number of cycles of usage for use on the second wireless network.

8. The tangible non-transitory, computer-readable media of the home network controller device of claim 7, wherein first airtime fairness portion comprises a percentage of the number of tokens of the first predetermined number of cycles of usage for use on the first wireless network.

9. The tangible non-transitory, computer-readable media of the home network controller device of claim 7, the computer-readable instructions when executed by the one or more processors further cause the one or more processors to perform one or more further operations comprising:

increasing, via the processor, the second number of tokens for use on the first wireless network and the second wireless network over a third predetermined number of cycles of usage when a number of unused tokens over the second predetermined number of cycles of usage is less than a second threshold so as to establish a third number of tokens for use on the first wireless network and the second wireless network over the third predetermined number of cycles of usage;

establishing, via the processor, a first airtime fairness portion of the third number of tokens of the third predetermined number of cycles of usage for use on the first wireless network; and establishing, via the processor, a second airtime fairness portion of the third number of tokens of the third predetermined number of cycles of usage for use on the second wireless network.

\* \* \* \* \*